Jan. 8, 1952  R. D. MALIN ET AL  2,581,678
WHEELED SPRAYING DEVICE
Filed April 26, 1947  2 SHEETS—SHEET 1
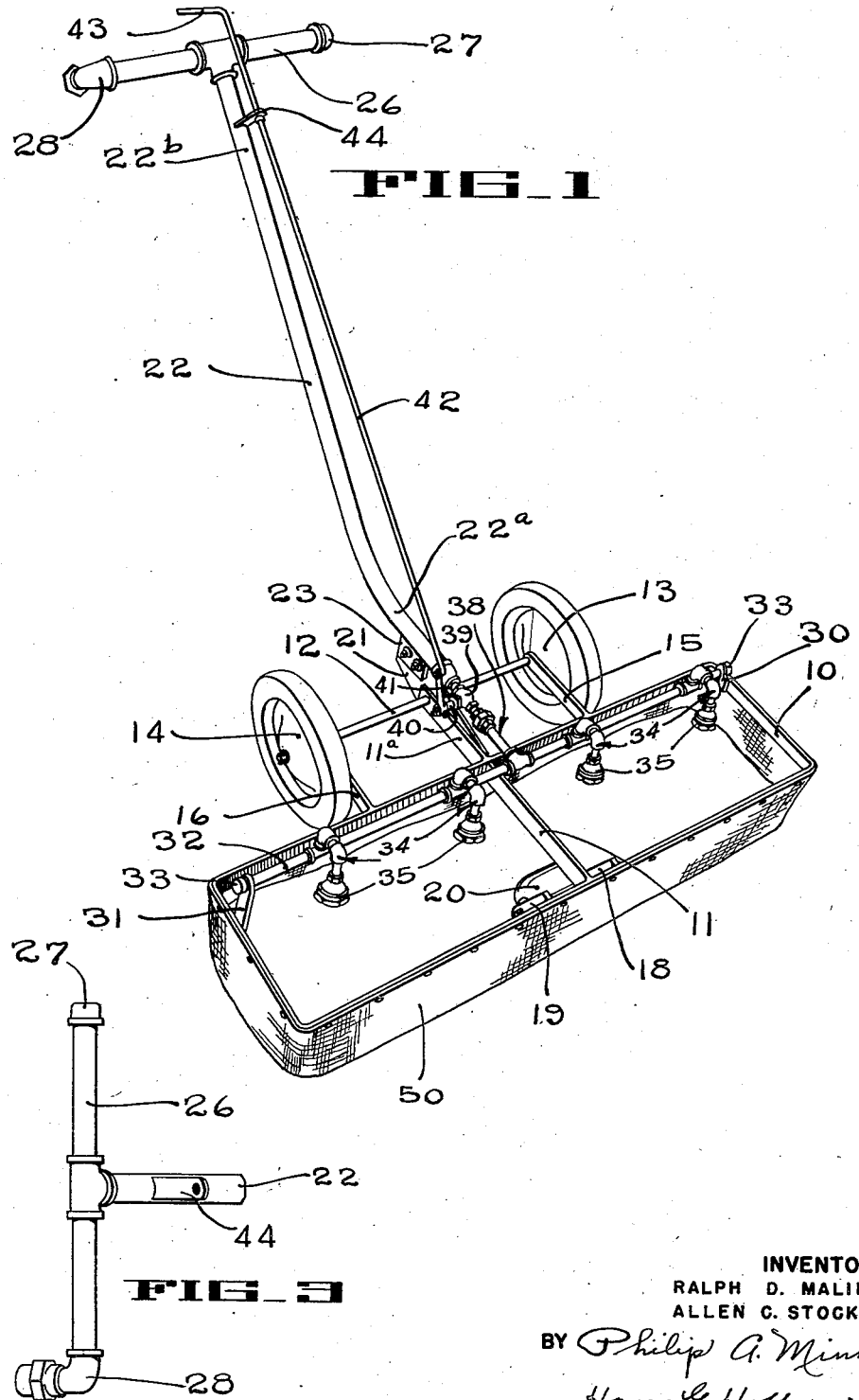
FIG_1
FIG_3
INVENTORS
RALPH D. MALIN
ALLEN C. STOCKDALE
BY Philip A. Minnis.
Hans G. Hoffmeister.
ATTORNEYS Jan. 8, 1952  R. D. MALIN ET AL  2,581,678
WHEELED SPRAYING DEVICE
Filed April 26, 1947 2 SHEETS—SHEET 2
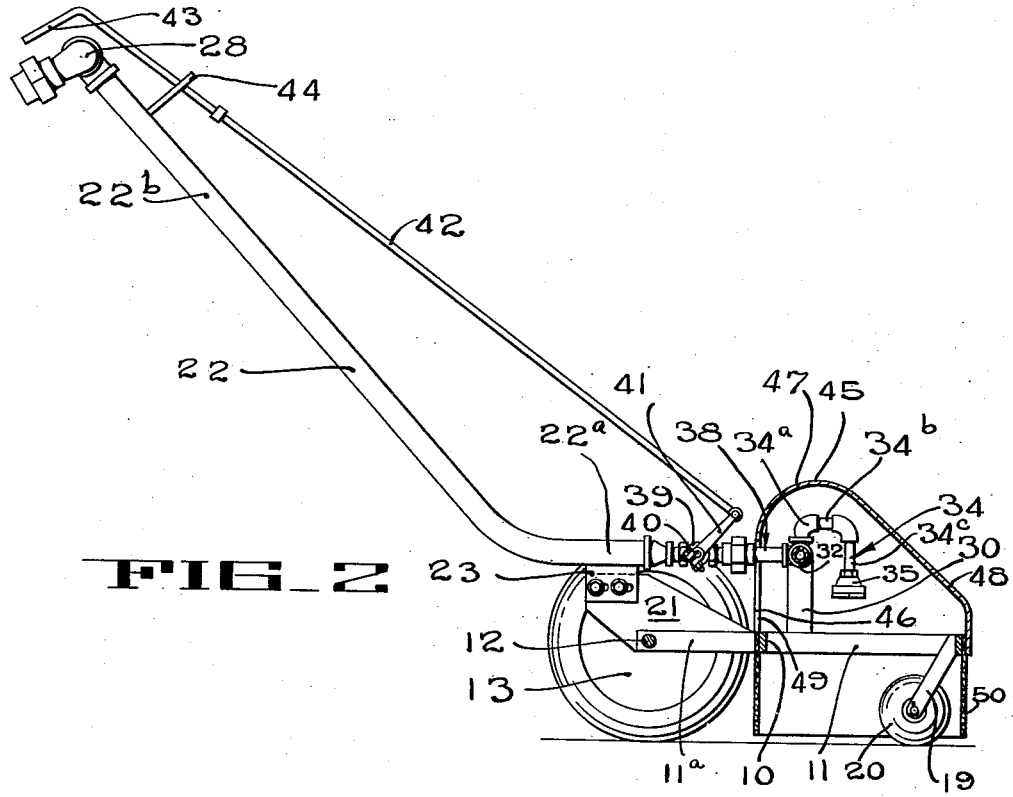
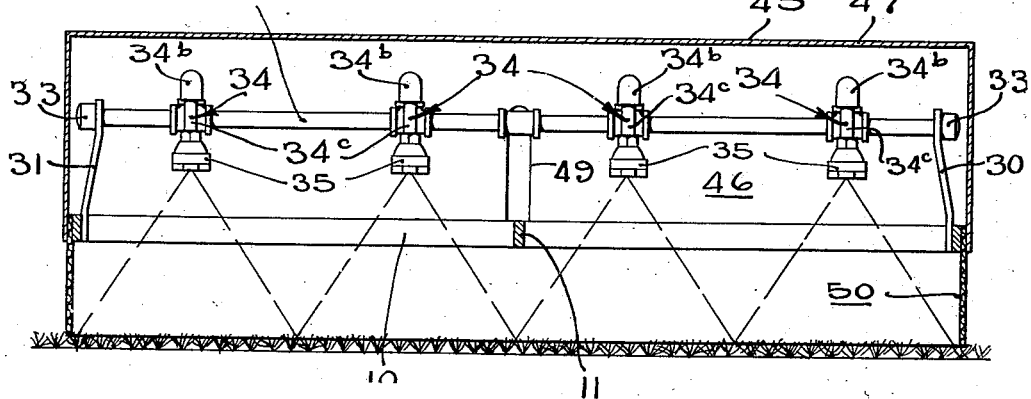
INVENTORS
RALPH D. MALIN
ALLEN C. STOCKDALE
BY Philip A. Minnis.
Hans G. Hoffmeister.
ATTORNEYS Patented Jan. 8, 1952

2,581,678

UNITED STATES PATENT OFFICE 2,581,678

WHEELED SPRAYING DEVICE

Ralph D. Malin and Allen C. Stockdale, Lansing, Mich., assignors to Food Machinery and Chemical Corporation, a corporation of Delaware Application April 26, 1947, Serial No. 744,226

2 Claims. (Cl. 299—47)

1

The present invention relates to sprayers for agricultural and horticultural purposes; in particular it relates to sprayers of the mobile or traveling type, such as may be employed to distribute weed killing substances in liquid solution over lawns, in gardens, parks, orchards, and the like.

The selective quality of potent liquid herbicides of the type here contemplated, to destroy the growth of weeds, without at the same time destroying the growth of grass, is based upon the fact that the unwanted weeds have usually materially larger foliage than the thin-bladed grass plants and hence will absorb a greater amount of the poisonous liquid than the grass. It will be understood, therefore, that proper distribution as well as the actual quantity applied to a given area, are of critical importance in the application of weed killing substances of the type referred to, lest some or all of the treated grass may die with the weeds. It will also be understood that none of the fog or vapor developed during distribution of the weed killing substance must be allowed to reach nearby flower beds, vegetable field, bushes or trees, because due to their large foliage, many of the mentioned plants are as sensitive to the poisonous effects of the weed-killing substances as the weeds that are supposed to be destroyed. It is for these reasons that sprinkling or spraying devices such as are in general use for irrigation purposes or for the distribution of fertilizers and insecticides do not lend themselves to the application of weed-killing substances.

One object of the present invention is to furnish a spraying device, of the mobile or traveling type, adapted to provide high uniformity of distribution of the sprayed substance over the area over which it is passed.

Another object is to provide a spraying device of the type referred to, especially for the application of weed-killing liquids to lawns, which enables an operator to distribute these liquids with such uniformity as will effectively eradicate all undesirable weeds without causing harm to the lawn itself.

Another object is to provide a mobile spraying device of the type referred to, adapted to produce high uniformity of distribution of the dispensed liquid transversely to its direction of travel, leaving neither untreated gaps nor patches of excessive application.

Another object is to provide a mobile spraying device, especially for the application of weed-killing liquids, which is of such construction as to confine its spray, and the vapors developed by the spraying process, to a predetermined space of limited compass.

Another object is to provide a sprinkling or spraying device of the mobile type in which any "after-drip" is reduced to a minimum.

Another object is to provide a sprayer wherein clogging of the spray nozzles by impurities as may be carried along in the spraying liquid has been substantially eliminated.

Another object is to provide a traveling type spraying device of great maneuverability which is adapted to negotiate obstructions in its path of travel without particular effort on the part of the operator.

Another object is to provide a spraying device of the mobile type which is of simple and light construction, and is composed of a minimum number of separate elements to facilitate its manufacture and reduce its cost.

Other and further objects of the present invention will become apparent from the following description and drawings in which:

Fig. 1 is a perspective view of a spraying device embodying the present invention, with its hood or cover removed to expose the structure underneath.

Fig. 2 is a side elevation of the same device partly in section.

Fig. 3 is a plan view of the handle of the spraying device.

Fig. 4 is a front end view of the spray nozzles and their supply manifold with the hood and the supporting frame shown in section.

Referring to Fig. 1, a rectangular frame 10 of steel or any other suitable material is rigidly mounted upon a centrally positioned cross bar 11 which has an extension 11a projecting rearwardly of frame 10. The extension 11a is pivotally supported on a transversely disposed axle 12. Rotatably mounted on opposite ends of axle 12 are wheels 13 and 14, respectively, preferably provided with rubber tires. The cross bar 11 may be integral with the frame 10 or it may be rigidly attached to the frame in any suitable manner. To provide added support for frame 10 two arms 15 and 16 integral with, and projecting rearwardly from the frame at either side of extension 11a, are likewise pivotally mounted upon axle 12 interiorly of, and closely adjacent to the wheels 13 and 14, respectively. The rectangular frame 10 (Fig. 1) extends a material distance beyond wheels 13 and 14 in lateral direction so as to provide maximum ground coverage transversely of the direction of travel of the machine without impairing the maneuverability of the vehicle by excessively spacing wheels 13 and 14.

Rigidly attached to the front bar of frame 10 (Figs. 1 and 2) at either side of cross bar 11 are two obliquely depending arms 18 and 19. A roller 20 is pivotally supported between the lower ends of said arms to maintain all of frame 10 in parallel relation to the ground as the vehicle is pushed or drawn thereover.

From the lateral side bars of rectangular frame 10 rise two arms or brackets 30 and 31, respectively (Figs. 1 and 4), which support a distributor pipe or manifold 32 extending transversely over practically the whole width of the rectangular frame 10 transversely of the machine.

The manifold or distributor pipe 32 (Fig. 4) has four branches 34 which are equally spaced from one another and of goose-neck shape, that is to say, each branch pipe 34 (Fig. 2) has a vertically ascending forwardly curved portion 34a, a forwardly directed and downwardly curved neck 34b, and a vertically descending portion 34c that may extend below the horizontal level of the distributor pipe 32, and which terminates into a nozzle 35. The nozzles 35 are each of the "fan-spray" type, i. e., they are of such construction as to form a spray of triangular shape and substantially two-dimensioned character. The nozzles 35 are so aligned that the triangular sprays of all of them extend in a common plane transversely to the direction of travel of the machine. Moreover, the intervals between the nozzles and the position of the nozzles above lawn level are carefully related to the spraying angle of whatever particular nozzle design may be employed, so that the spray fans of each two adjacent nozzles will just meet at lawn level without overlapping (Fig. 4). Thus, there will be no untreated gaps between the individual spray fans nor will there be any excess application of the weed-killing substance in the border areas of adjacent sprays such as may destroy the grass as well as the weed. The device will direct a practically homogeneous vertical sheet of atomized weed-killing liquid against the lawn transversely across the path over which it travels and hence the intensity of application to any and all parts of the covered area is exclusively determined by the speed with which the machine is advanced over the ground and/or the pressure with which the liquid is discharged from the machine.

It will be understood that in case nozzles of a narrower spraying angle are employed, such nozzles will have to be positioned closer together and/or may have to be located higher above the lawn to provide uniformity of distribution.

Vice versa, if nozzle designs of a wider spraying angle are employed, these nozzles will have to be spaced farther apart and/or they may have to be positioned closer to the lawn level to provide even distribution of the liquid and avoid excess treatment of any part or parts of the lawn over which the vehicle is operated.

The operating boom of the described vehicle is formed by a long metal pipe 22. The forward end of pipe 22 is provided with a depending bracket 23 which is bolted to an upwardly extending plate 21 rigidly carried by the rearward end of cross bar extension 11a.

The pipe 22 (Fig. 2) is bent at an obtuse angle to form a substantially horizontal front portion 22a and an obliquely ascending rear portion 22b. A cross-pipe 26 (Fig. 3) is joined to the upper end of pipe 22 in the manner of a T-bar to form an operating handle. One end of cross-pipe 26 is closed off by a screw cap 27 while the other end is provided with an elbow joint 28 adapted for connection of a hose from a pressure conduit. It should be noted that the arrangement is such that the screw cap 27 and the coupling joint 28 are interchangeable so that the supply hose may be connected at either side of the cross pipe 26 as desired.

The forward end 22a of handle pipe 22 is connected with the manifold 32 by a conduit structure 38 including a suitable control valve 39 which has a laterally protruding control stem 40. Firmly mounted upon the exterior end of control stem 40 is an operating arm 41 which in turn is pivotally engaged by the hooked end of an actuating rod 42. The actuating rod 42 extends rearwardly of the vehicle, as shown, and terminates into a bent handle portion 43 disposed above the cross-pipe 26 within convenient reach of the operator moving the machine. A guide member 44 rigidly attached to the pipe 22 near the upper end thereof, serves to maintain the actuating rod 42 in its proper position.

When the operating arm 41 is in the forwardly inclined position illustrated in Fig. 2, the control valve 39 is closed. To open the valve and initiate the flow of the weed-killing solution to the manifold 32 and the spray nozzles 35, the actuating rod 42 is pulled backward in upward direction to swing operating arm 41 into the backwardly inclined position illustrated in Fig. 1.

It should be noted that the described control valve 39 is located close to the forward end, and in the lowermost portion of the supply conduit. It should also be observed that the branch pipes 34 which distribute the supply of liquid to the various spray nozzles 35, have a short upward portion 34a, as previously pointed out. As a result of these features any "after-drip" from the nozzles, upon closure of valve 39, is reduced to a minimum because due to the described location of the control valve there is no liquid column of a higher gravitational level than the discharge pipes 34 in the open forward portion of the supply line. Moreover, any liquid that remains in the conduit structure 38 and manifold 32, after the valve has been closed, will be unable to negotiate the rise in goose-neck pipes 34.

The sharp upward bend in the flow of the dispensed liquid as established by the upwardly directed portions of branch pipes 34 has the added advantage of causing impurities contained in the solution to settle in the horizontal distributor pipe 32 and, therefore, materially reduces clogging of the spray nozzles 35. To facilitate removal of the dirt which will thus collect in the distributor pipe 32, the two ends of said pipe are closed off by screw caps 33, as shown in Fig. 4, which may conveniently be removed to permit the pipe to be flushed out.

Referring to Fig. 2, it will be seen that the entire frame 10, the goose-neck pipes 34 and the spray nozzles 35, are covered by a detachable hood 45 of sheet metal or any other suitable material. The hood 45 has a vertical rear wall 46, an arched dome or ceiling 47, and an obliquely descending front wall 48, and is adapted to fit tightly over the frame. A vertical slot 49 in the rear wall 46 of the hood provides an opening for the conduit structure 38.

The frame 10 is also provided with a depending drape or curtain 50 extending all around its circumference (Fig. 1) and reaching down to lawn level as shown in Figs. 2 and 4. Curtain 50 may be riveted to frame 10 or otherwise secured thereto in any suitable manner, and is preferably of a water-proof canvas.

The hood 45, when placed over frame 10 and nozzle assembly 34, 35, together with the canvas drape 50, completely encloses the spray nozzles 35 and the space between the nozzles and lawn so that as the machine is pushed by the operator over the lawn neither the spray nor any fog or vapor developed by the spraying operation, may reach any other place but the rectangular area directly underneath the frame. The machine may, therefore, be safely operated near flower beds, bushes, trees, or vegetables without the slightest danger of harming any of these sensitive plants.

It should here be noted that the roller 20 below the central front portion of the frame 10 assists in maintaining the highly uniform distribution of the liquid since it holds the frame 10 and the nozzles 35 at precisely the correct altitude above the lawn as the vehicle is moved thereover.

In addition, roller 20 makes it easy to push the machine over uneven ground and small obstructions, such as curbings, because the operator does not have to lift the entire vehicle over the obstruction; he simply presses down the handle 26 so as to elevate the roller onto the top of the obstruction, and then uses it as a fulcrum to elevate the whole vehicle.

Although the machine of the present invention is of particular advantage and utility in the application of weed-killing substances to lawns, it will be understood that the same may advantageously be employed for the distribution of liquid fertilizers, insecticides, or the like.

While we have described a particular embodiment of the present invention it will be understood that various changes and modifications may be made without departing from the spirit of the present invention and the scope of the appended claims.

Having thus described our invention and in what manner the same may be used, what we claim as new and desire to protect by Letters Patent is:

1. A vehicular device for applying potent liquid herbicide to lawn grasses comprising a wheeled supporting frame having a horizontal aperture therein, a plurality of laterally aligned spray nozzles mounted to discharge a substantially uniform spray curtain downwardly through said aperture, a spray-tight enclosure mounted with its marginal edge removably supported on said frame to surround and overlie said horizontal aperture and the spray nozzles discharging therethrough, and a flexible spray-tight curtain secured to said frame to depend marginally from said enclosure to lawn level, whereby spray particles are prevented from escaping and are concentrated on the lawn area beneath said enclosure.

2. An arrangement according to claim 1 wherein a pair of fulcrum supporting wheels are mounted rearwardly of said enclosure, and a rolling spray guide member is mounted on a forward portion of said frame, adjacent spray nozzles being adjusted, relatively to each other and to the lawn level, as determined by a plane through the bottoms of the wheels and the roller spray guide, to join the sprays therefrom without overlap at the lawn level.

RALPH D. MALIN.
ALLEN C. STOCKDALE.

REFERENCES CITED

The following references are of record in the file of this patent:

UNITED STATES PATENTS

| Number | Name | Date |
| --- | --- | --- |
| 545,310 | Richards | Aug. 27, 1895 |
| 1,554,875 | Miles | Sept. 22, 1925 |
| 1,617,673 | Dezurik | Feb. 15, 1927 |
| 1,668,582 | Buckner | May 8, 1928 |
| 1,724,702 | Flickinger | Aug. 13, 1929 |
| 2,051,182 | Saunders | Aug. 18, 1936 |
| 2,086,055 | Taylor | July 6, 1937 |
| 2,367,594 | Madison | Jan. 16, 1945 |